US005595090A

United States Patent [19]
Moribayashi

[11] Patent Number: 5,595,090
[45] Date of Patent: Jan. 21, 1997

[54] PLANET GEAR TYPE TORQUE TRANSMISSION DEVICE

[75] Inventor: Satoshi Moribayashi, Hyogo, Japan

[73] Assignee: Mitsubishi Denki Kabushiki Kaisha, Tokyo, Japan

[21] Appl. No.: 273,162

[22] Filed: Jul. 25, 1994

[30] Foreign Application Priority Data

Oct. 18, 1993 [JP] Japan .................................. 5-259703

[51] Int. Cl.$^6$ ..................................................... F16H 1/28
[52] U.S. Cl. ...................... 74/462; 74/DIG. 10; 475/901
[58] Field of Search ............................. 74/DIG. 10, 462; 475/901, 902; 29/893.3, 893.37; 264/38

[56] References Cited

U.S. PATENT DOCUMENTS 4,715,243  12/1987  Morishita et al. .................. 74/DIG. 10
5,059,464  10/1991  Mikuni ................................ 74/DIG. 10
5,157,978  10/1992  Morishita et al. ............................ 74/7
5,267,918  12/1993  Shiroyama .......................... 74/DIG. 10

FOREIGN PATENT DOCUMENTS 27262    2/1990  Japan .............................. F02N 15/02
4121469  10/1992  Japan .............................. F02N 15/02

*Primary Examiner*—Khoi Q. Ta
*Attorney, Agent, or Firm*—Sughrue, Mion, Zinn Macpeak & Seas

[57] ABSTRACT

In a planet gear type torque transmission device, the internal teeth of an internal gear integrally formed by resin molding are arranged regularly for the ribs for coupling the inner periphery and the outer periphery of the gear. Thus, the mold can also be modified regularly so as to form the internal teeth with high accuracy.

17 Claims, 7 Drawing Sheets

5,595,090

PLANET GEAR TYPE TORQUE TRANSMISSION DEVICE

BACKGROUND OF THE INVENTION

The present invention relates to a planet gear type torque transmission device for use in a starter for vehicles or the like.

Previously known planet gear type torque transmission devices are disclosed in e.g. Postexamined Japanese Utility Model Publication (Kokoku) Hei-2-7262 and Unexamined Japanese Utility Model Publication (Kokai) Hei-4-121469.

First, respective components in FIGS. 9 to 13 for explaining the prior will be explained. Reference numeral 1 denotes an internal deceleration type starter including a planet gear type deceleration device 2 (described later) serving as a torque transmission device. Numeral 3 denotes a front machine frame externally fixed. Numeral 4 denotes an internal gear mounted on the inside 3a of the front machine frame 3. This internal gear is integrally formed by high-polymer synthetic resin) by molding. Numerals 5 denote two concave portions which are provided symmetrically in the outer periphery 6 (described later) of the internal gear 4. The internal gear 4 is set in the front machine frame when the concave portions 5 are fit in the convex portions 3b formed in the front machine frame 3. Numeral 6 denotes the outer periphery of the thin internal gear. Numeral 7 denotes a rib serving as a pillar coupling portion for coupling the outer periphery 6 and an inner periphery 13 (described later). Numeral 9 denotes a through-hole formed by the outer periphery 6, rib 7 and inter periphery 13. A through bolt (not shown) penetrates through the through-hole.

A flange portion 10 is provided at the right end of the internal gear 4 in FIG. 9. The inside of the flange portion 10 constitutes a boss portion 11. A sleeve bearing 12 is fit in the inside of the boss portion 11. Internal teeth 14 are successively provided at regular intervals in the inner periphery 13 of the internal gear 4. A planet gear 15, which abuts on the insides of the internal teeth 14, engages the internal teeth 14. The planet gear 15 has a through-hole 16. The planet gear 15 is supported by a supporting pin 17 fit in the through-hole 16 through the sleeve bearing 18. Since the supporting pin 17 is fit in the output rotary shaft flange portion 20 integrally formed on the left end of an output rotary shaft 19 in FIG. 9, the revolving force of the planet gear 15 is transmitted to the output rotary shaft 19. The output rotary shaft 19 is rotatably supported by the flange portion 10 through the sleeve bearing 12.

The planet gear 15 also engages a spur gear 22 attached to the input rotary shaft 21 on the side opposite to the side where it engages the internal teeth 14. The input rotary shaft 21, which is the rotary shaft of a DC motor (not shown), provides a revolving force to the planet gear 15 through the spur gear 22. The input rotary shaft 21 and output rotary shaft 19 are made rotatable by the sleeve bearing 23 and a rotary ball 24. Incidentally, numeral 25 denotes an iron for jointing the DC motor (not shown) to the front machine frame 3. In the arrangement described above, the planet gear deceleration device 2 is composed of the internal gear 2, planet gear 4 and spur gear 22.

In operation, when the input rotary shaft 21 rotates by energization of the DC motor (not shown), this rotation is supplied to the planet gear deceleration device 2. Thus, the rotation with reduced rotary speed and enhanced rotary force will be transmitted from the planet gear deceleration device 2 to the output rotary shaft 19.

In fabrication of the internal gear 4, a mold is used for molding high-polymer synthetic resin. When the mold has a shape not collected as indicated by a solid line in FIG. 12, in the fabrication process, thermal shrinkage of the high-polymer synthetic resin called "mold reduction" occurs. Particularly, the mold reduction occurs in the directions of arrows a at the ribs 7 in FIG. 12. As a result, the ribs 7 are distorted as indicated in one-dot chain line in FIG. 12 after molding. In order to obviate such an inconvenience, correction indicated by a solid line in FIG. 13 is previously added to the mold. After molding, the mold reduction leads to the internal gear 4 having the shape indicated by a solid line in FIG. 13.

In the planet gear type torque transmission device as described above, in integrally forming the internal gear by resin molding, the mold reduction due to the shrinkage of the ribs occurs so that the internal teeth are deformed. This required the mold to be modified in forming the internal gear by resin molding.

Further, since the ribs provided in the outer periphery of the internal gear are irregularly located with respect to the internal teeth, deformation of the internal teeth due to the mold reduction for the ribs occurs irregularly. This makes it impossible to perform regular correction for the internal teeth portion of the mold, thus making it difficult to increase the accuracy of the internal teeth.

SUMMARY OF THE INVENTION

An object of the present invention is to provide a planet gear type torque transmission device in which internal teeth of an internal gear are provided with high accuracy owing to easiness of modification of a mold used for fabricating the internal gear.

In order to attain the above object, in accordance with one aspect of the present invention, there is provided a planet gear type torque transmission device comprising a planet gear driven by a rotary shaft and an internal gear composed of an inner periphery provided with internal teeth engaged with the planet gear, an outer periphery and coupling portions for coupling the inner periphery and outer periphery, the internal gear being integrally formed by resin molding, wherein the coupling portions are located at fixed positions for the inner teeth. Thus, deformation of the internal teeth due to the shrinkage of the coupling portions in integrally forming the internal gear by resin molding is regular so that the mold can be modified regularly and so easily.

In another aspect of the present invention, the internal teeth are arranged symmetrically with respect to the lines extended toward the radial direction of the internal gear from the joint points of the coupling portions and the inner periphery. Thus, deformation of the internal teeth due to the shrinkage of the coupling portions in integrally forming the internal gear by resin molding is symmetrical so that the mold can be modified symmetrically and so easily.

In a still another aspect of the present invention, the tips of the internal teeth are arranged in the radial direction from the joint points of the coupling portions and the inner periphery. Thus, deformation of the internal teeth due to the shrinkage of the coupling portions in integrally forming the internal gear by resin molding is symmetrical on both sides of the teeth tips so that the mold can be modified symmetrically on both sides of the teeth tips and so easily.

In a further aspect of the present invention, the bottoms of the inner teeth are arranged in the radial direction of the internal gear from the joint points of the coupling points and the inner periphery. Thus, deformation of the internal teeth due to the shrinkage of the coupling portions in integrally forming the internal gear by resin molding is symmetrical on both sides of the teeth bottoms so that the mold can be modified symmetrically on both sides of the teeth bottoms and so easily.

In a still further aspect of the present invention, the coupling portions have gradients for the radial direction of the internal gear at the joint points of the coupling portions and the inner periphery. Thus, the direction of shrinkage of the coupling portions in integrally forming the internal gear by resin molding is inclined so that the internal teeth are deformed slightly and so their accuracy can be enhanced.

In a further aspect of the present invention, each of the coupling portions is branched at the joint points of the coupling portions and inner periphery. Thus, the shrinkage force due to shrinkage of the coupling portions in integrally forming the internal gear by resin molding is dispersed so that the internal teeth are deformed slightly and so their accuracy can be enhanced.

In a further aspect of the present invention, each of the coupling portions is branched in both sides of the radial direction of the internal gear at the joint points of the coupling portions and internal teeth. Thus, the shrinkage force due to shrinkage of the coupling portions in integrally forming the internal gear by resin molding is canceled in the peripheral direction so that the internal teeth are deformed slightly and so their accuracy can be enhanced.

In a further aspect of the present invention, at least two bottoms of the internal teeth are arranged between the coupling portions. Thus, at least one internal tooth with less deformation due to the shrinkage of the coupling portions in integrally forming the internal gear by resin molding so that the internal teeth are deformed slightly and so their accuracy can be enhanced.

The above and other objects and features of the present invention will be more apparent from the following description taken in conjunction with the accompanying drawings.

DETAILED DESCRIPTION OF THE PREFERRED EMBODIMENTS

Embodiment 1

Figure 1:
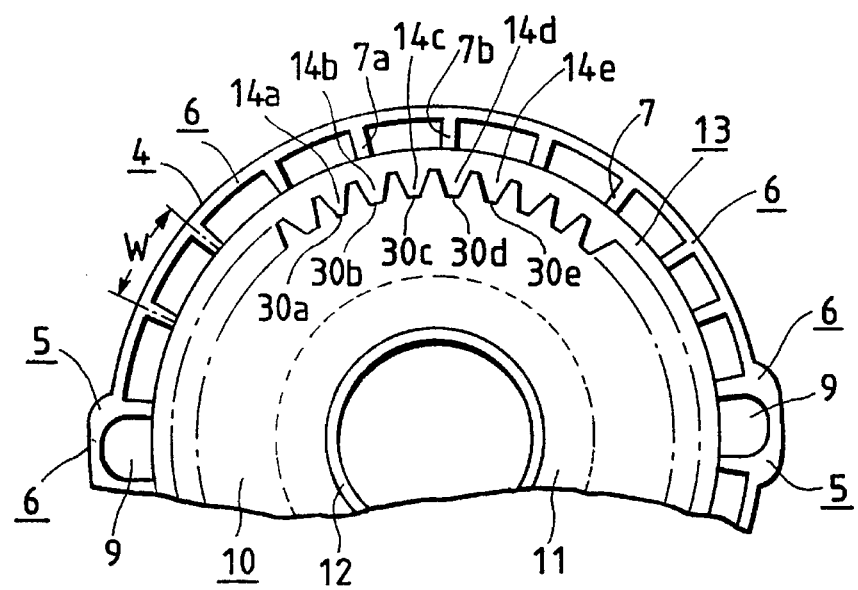
FIG. 1 is a front view showing the internal gear according to the first embodiment of the present invention.
Figure 2:
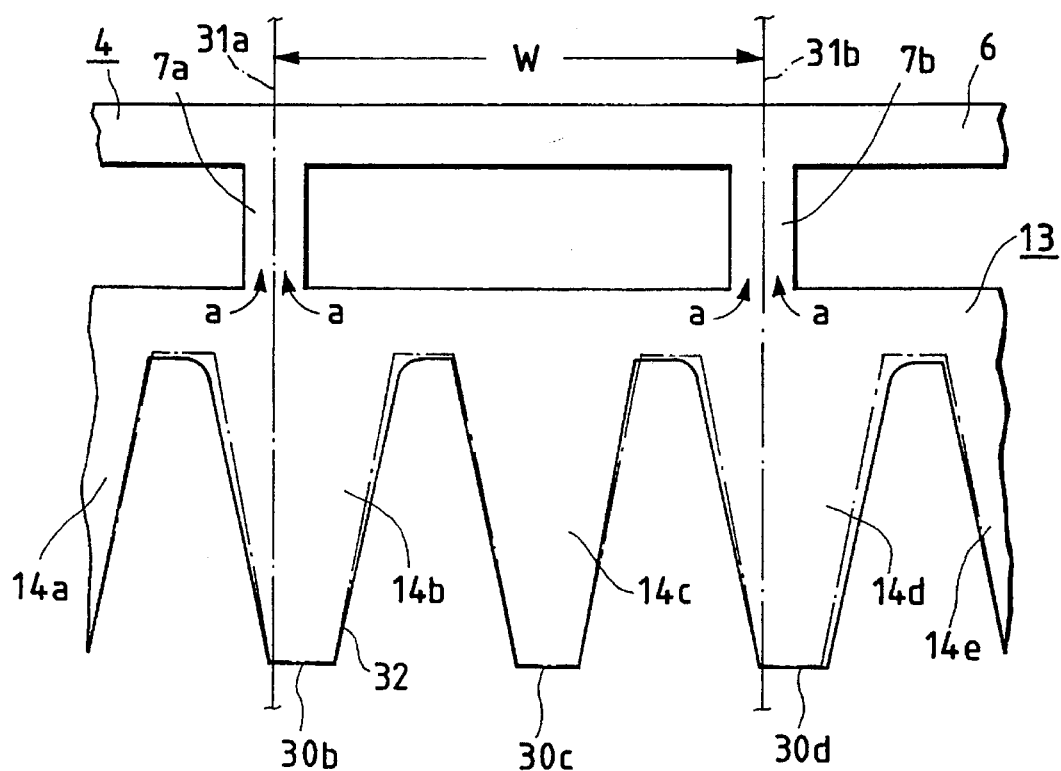
FIG. 2 is a view for explaining deviation of the internal gear according to the first embodiment from its mold.

FIG. 1 is a front view showing the internal gear according to the first embodiment of the present invention. FIG. 2 is a view for explaining deviation of the internal gear from the mold for molding it.

In FIG. 1, reference numeral 30 generally denotes the tip of an internal tooth 14. Specifically, the internal teeth 14a, 14b, 14c, 14d and 14e have their tips 30a, 30b, 30c, 30d and 30e, respectively. Reference numeral 31 denotes the extended line of the center line of a rib 7, represented by a dotted line in FIG. 2. Namely, the rib 7a has an extended line 31a of its center line, and the rib 7b has an extended line 31b of its center line. The ribs 7 are arranged at regular intervals W which is a width between the lines 31a and 31b.

Figure 9:
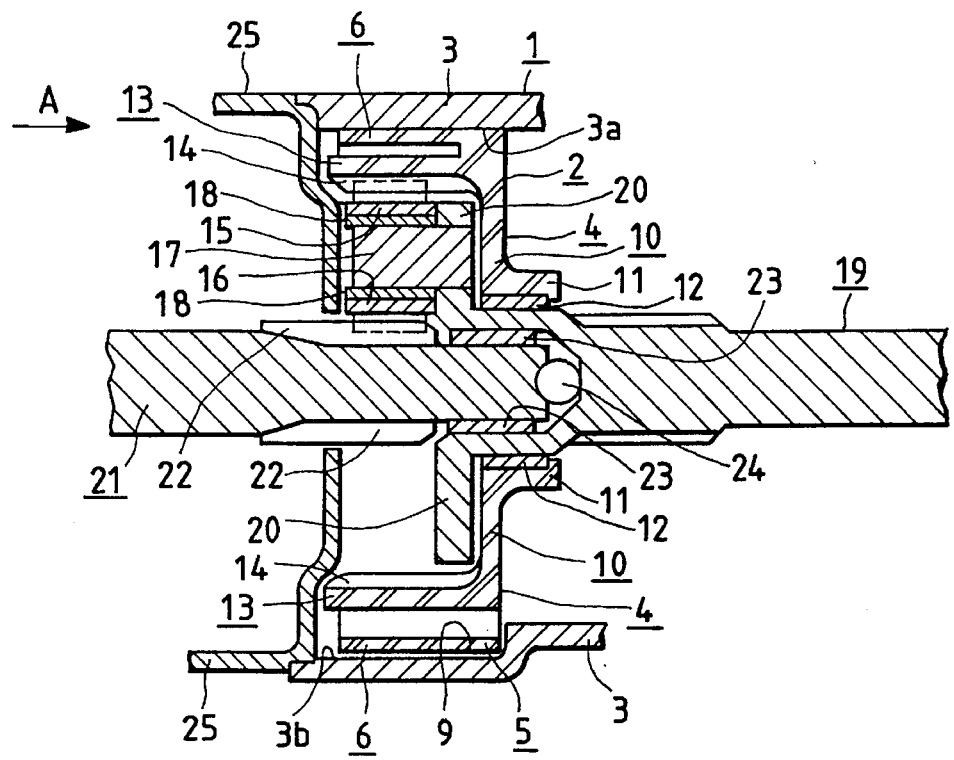
FIG. 9 is a sectional view of an internal deceleration type starter using the planet gear type torque transmission device according to the prior art.
Figure 10:
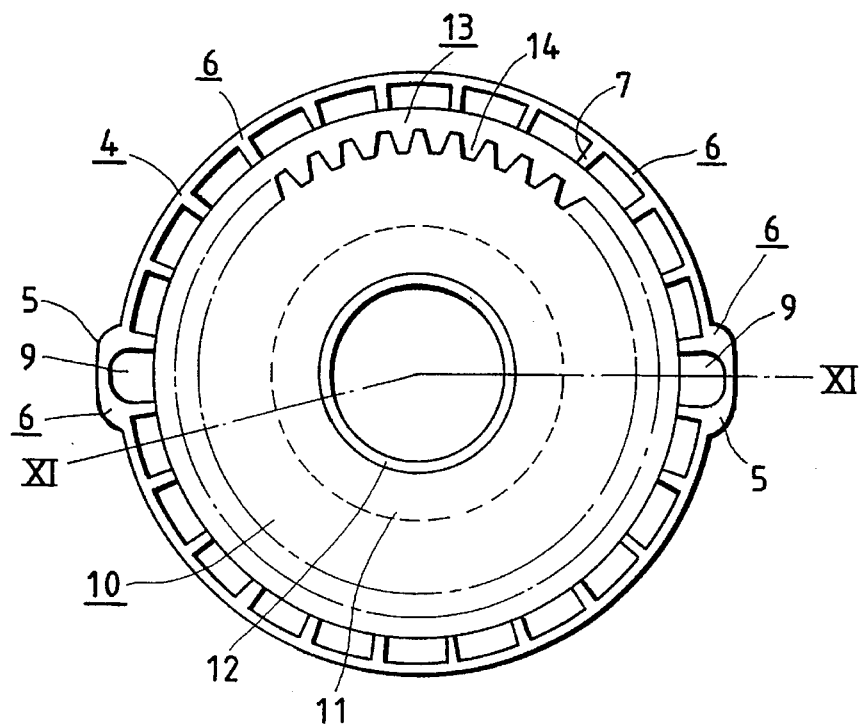
FIG. 10 is a front view of the internal gear viewed from the direction of an arrow a in FIG. 9.
Figure 11:
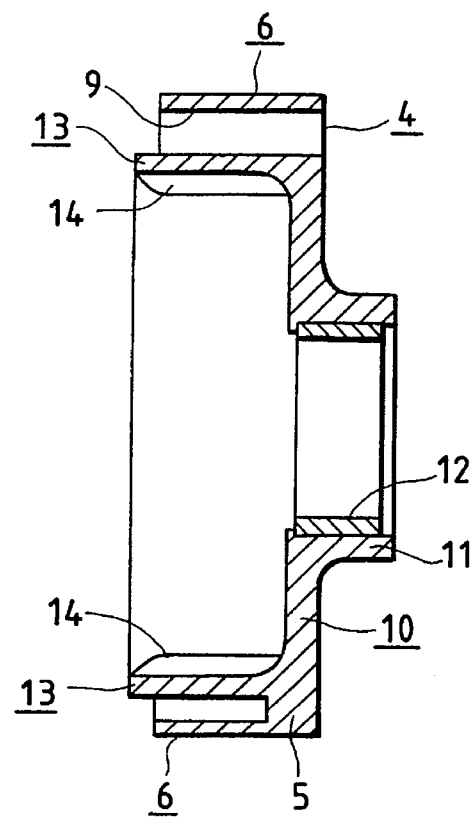
FIG. 11 is a sectional view of the internal gear taken along line XI—XI in FIG. 10.
Figure 12:
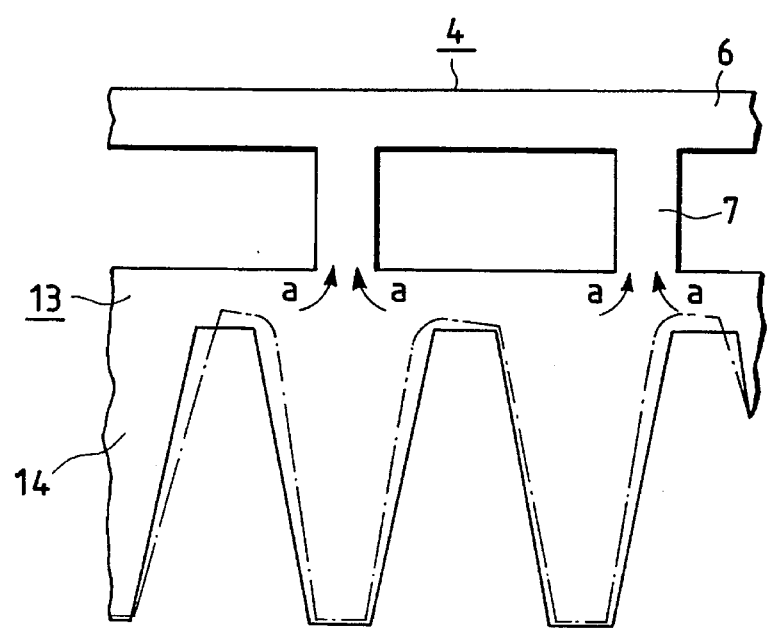
FIG. 12 is a view for explaining the deviation of an internal gear from its mold when the mold is not modified in the planet gear type torque transmission device according to the prior art.
Figure 13:
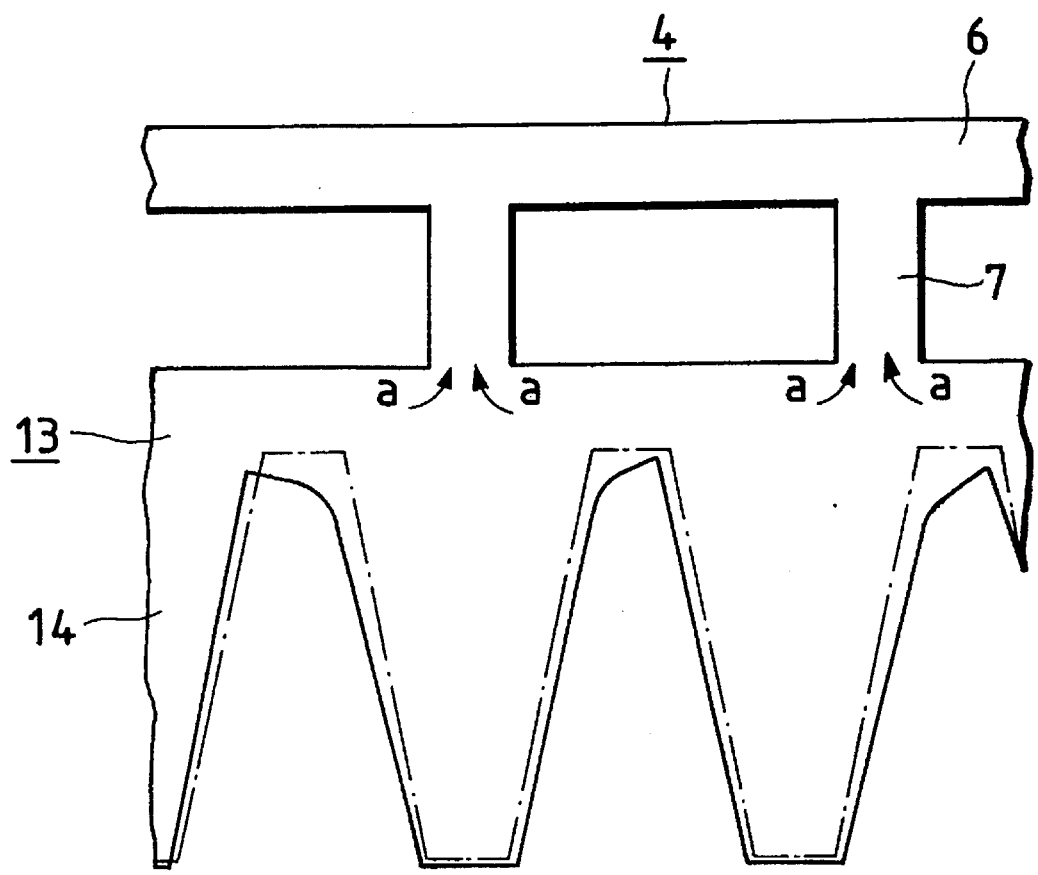
FIG. 13 is a view for explaining the deviation of an internal gear from its mold in the planet gear type torque transmission device according to the prior art.

In FIG. 2, the solid line of the internal teeth 14 designate a mold shape 32. The one-dot chain line designates the shape of the internal teeth 4 formed by molding. In FIGS. 1 and 2, remaining reference numerals refer to like parts in FIGS. 9, 10 and 11 showing the prior art planet gear type transmission device.

In the planet gear torque transmission device thus formed, as shown in FIG. 2, the extended line 31 of the rib 7 passes through the predetermined position of the internal tooth 14 so that the rib 7 is arranged at a predetermined position for the internal tooth 14.

Thus, the deformation produced in the internal teeth 14 when the internal gear 4 is integrally formed by resin molding is the repetition of the deformation of the internal tooth 14 over the entire inner periphery of the internal gear 4. For this reason, the mold can be modified regularly.

Embodiment 2

Figure 3:
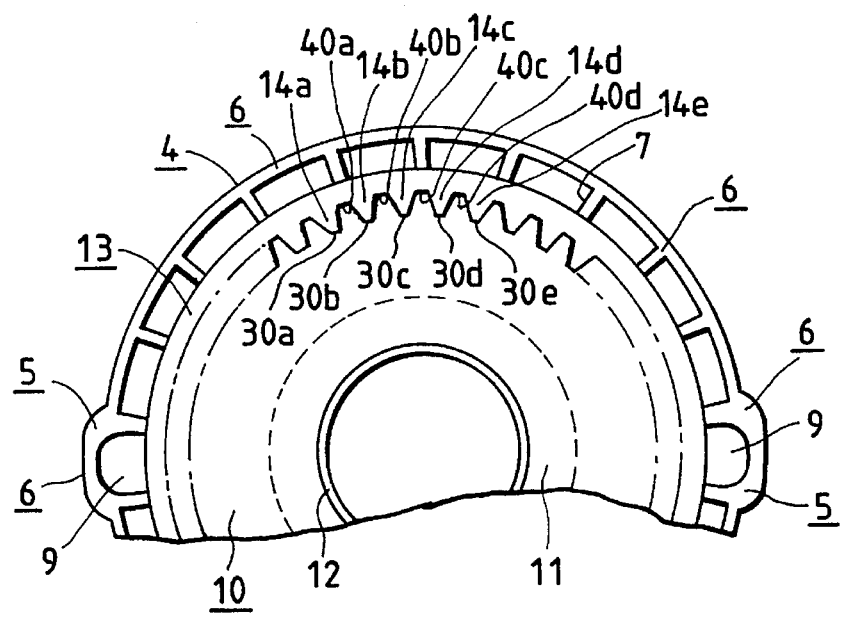
FIG. 3 is a front view showing the internal gear according to the second embodiment of the present invention.
Figure 4:
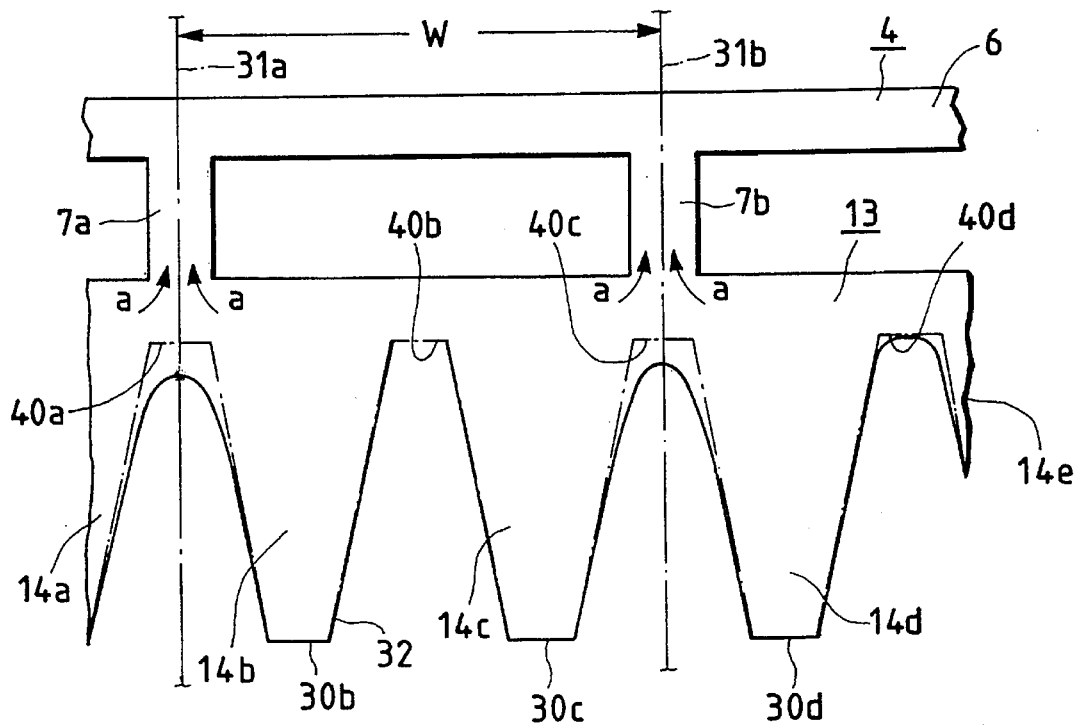
FIG. 4 is a view for explaining deviation of the internal gear according to the second embodiment from its mold.

FIG. 3 is a front view showing the internal gear according to the second embodiment of the present invention. FIG. 4 is a view for explaining deviation of the internal gear from the mold for molding it.

In FIG. 3, reference numeral 40 generally denotes the tooth bottom between internal teeth 14. Specifically, a tooth bottom 40a is located between internal teeth 14a and 14b; a tooth bottom 40b is located between internal teeth 14b and 14c; a tooth bottom 40c is located between internal teeth 14c and 14d; and a tooth bottom 40d is located between internal teeth 14d and 14d.

As seen from FIG. 4, since the extended line 31b passes through the tooth bottom 40c, the deformation between the internal teeth 14c and 14d due to "mold reduction" is symmetrical with respect to the extended line 31b. Thus, the mold can be modified symmetrically with respect to the extended line 31b. As a result, the mold can be modified symmetrically with respect to all the extended lines 31 over the entire inner periphery of the internal gear 4.

Embodiment 3

Figure 5:
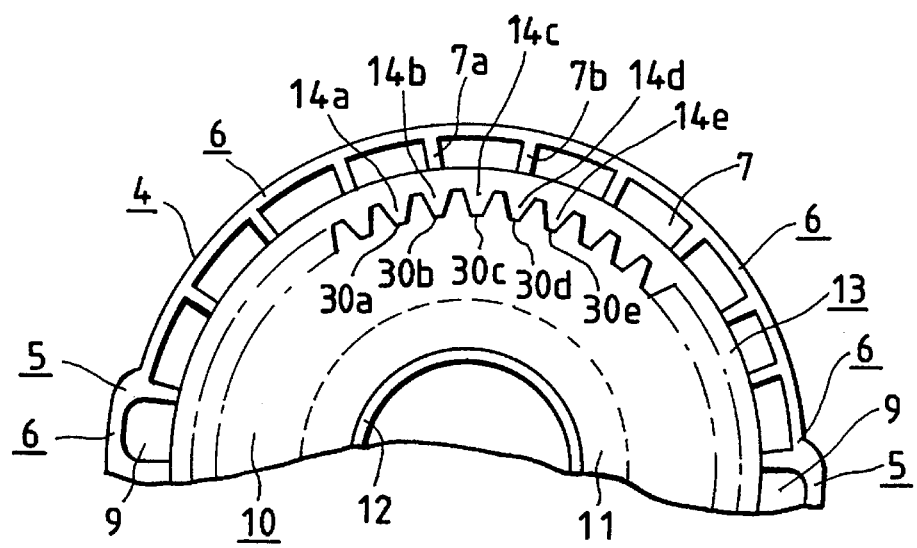
FIG. 5 is a front view showing the internal gear according to the third embodiment of the present invention.
Figure 6:
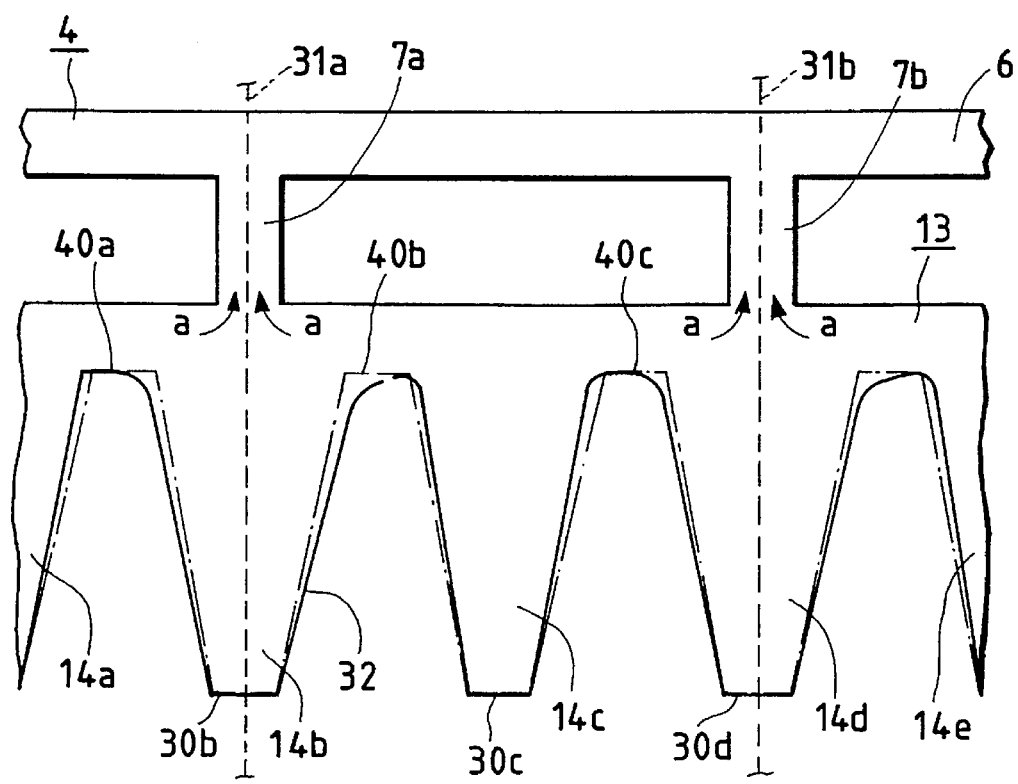
FIG. 6 is a view for explaining deviation of the internal gear according to the third embodiment from its mold.

FIG. 5 is a front view showing the internal gear according to the third embodiment of the present invention. FIG. 6 is a view for explaining deviation of the internal gear from the mold for molding it.

As seen from FIG. 6, since the extended line 31b passes through the tooth tip 30e, the deformation of the internal tooth 14d due to "mold reduction" is symmetrical with respect to the extended line 31b. Thus, the mold can be modified symmetrically with respect to the extended line 31b. As a result, the mold can be modified symmetrically with respect to all the extended lines 31 over the entire inner periphery of the internal gear 4.

The internal tooth 14c between the extended lines 31a and 31b has a tooth bottom 40b between itself and the extended line 31a and a tooth bottom 40c between itself and the extended line 31b. For this reason, the internal tooth 14c is free in a certain degree from the influence by the mold reduction occurring in the ribs 7 and so its deformation is smaller than that in the internal teeth 14b and 14c.

Embodiment 4

Figure 7:
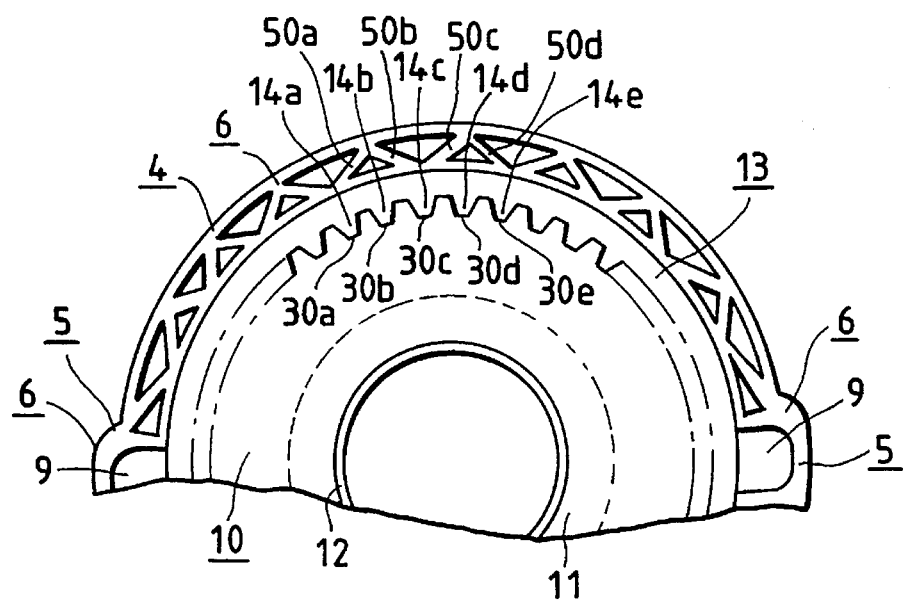
FIG. 7 is a front view showing the internal gear according to the fourth embodiment of the present invention.
Figure 8:
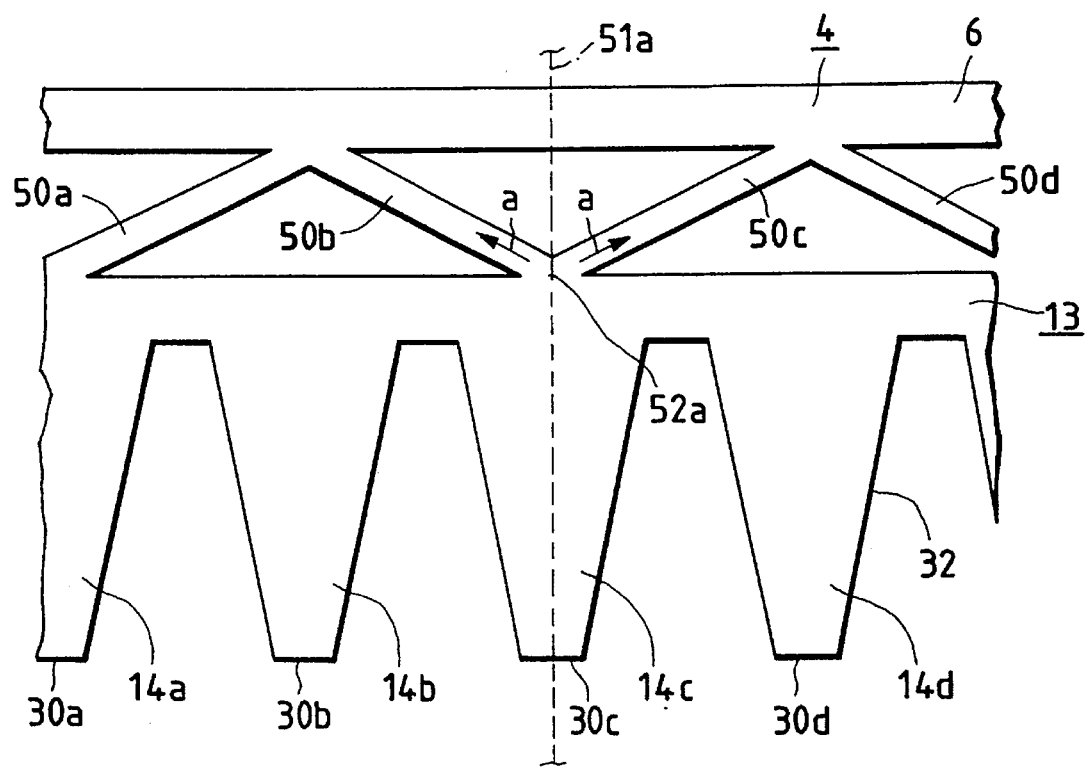
FIG. 8 is a view for explaining deviation of the internal gear according to the fourth embodiment from its mold.

FIG. 7 is a front view showing the internal gear according to the fourth embodiment of the present invention. FIG. 8 is a view for explaining deviation of the internal gear from the mold for molding it.

In FIG. 8, reference numeral 50 denotes a rib as a coupling portion and reference numeral 51 denotes an extended line extended from the joint point 52 of the ribs 50 and inner periphery 13 toward the radial direction of the internal gear 4. A rib 50a joins a rib 50b in an outer periphery 6; the rib 50b joins a rib 50c at the joint point 52a and the rib 50c joins a rib 50d in the outer periphery 6.

The rib 50 shrinks in the direction of an arrow a owing to the mold reduction. Thus, the shrinkage force due to mold reduction in the inner periphery 13 will be dispersed transversely by a degree inclined from the extended line 51a. Further, the shrinkage forces in ribs 50b and 50c due to mold reduction will be canceled each other in the peripheral direction. As a result, as seen from FIG. 8, less or no deviation of the internal teeth 14 from the mold will occur.

The respective embodiments could be applied to the internal deceleration type starter, but may be applied to other transmission devices.

What is claimed is:

1. A planet gear type torque transmission device comprising:
    a planet gear driven by a rotary shaft; and
    an internal gear having an inner periphery portion, an outer periphery portion, and coupling portions,
    wherein said inner periphery portion comprises internal teeth engaged with said planet gear,
    wherein said coupling portions couple said inner periphery portion and said outer periphery portion,
    wherein said internal teeth are arranged at predetermined regular intervals with respect to positions of said coupling portions, and
    wherein said internal gear is integrally formed by resin molding.

2. A planet gear type torque transmission device according to claim 1, wherein said coupling portions are located at fixed positions relative to said internal teeth.

3. A planet gear type torque transmission device according to claim 1, wherein said internal teeth are respectively arranged symmetrically with respect to lines extended in a radial direction of said internal gear from junction points of said coupling portions and said inner periphery.

4. A planet gear type torque transmission device according to claim 1, wherein tips of said internal teeth are respectively arranged in a radial direction from junction points of said coupling portions and said inner periphery.

5. A planet gear type torque transmission device according to claim 1, wherein tooth bottoms are located between adjacent pairs of said internal teeth and a predetermined number of said tooth bottoms respectively intersect lines extending in a radial direction of said internal gear from junction points of said coupling portions and said inner periphery portion.

6. A planet gear type torque transmission device according to claim 1, wherein said coupling portions respectively form angles with respect to lines extending in a radial direction of said internal gear from junction points of said coupling portions and said inner periphery portion.

7. A planet gear type torque transmission device according to claim 1, wherein each of said coupling portions is connected to said inner periphery portion at a corresponding junction point,
    wherein each of said coupling portions is branched at said corresponding junction point into a first portion and a second portion, and
    wherein said first portion and said second portion are connected to said outer periphery portion at two different points.

8. A planet gear type torque transmission device according to claim 7, wherein each of said coupling portions is branched such that said first portion is located on one side of a corresponding line and said second portion is located on another side of said corresponding line and wherein said corresponding line extends in a radial direction of said internal gear from said corresponding junction point.

9. A planet gear type torque transmission device according to claim 1, wherein tooth bottoms are located between adjacent pairs of said internal teeth and wherein at least two tooth bottoms are located between adjacent pairs of said coupling portions.

10. A planet gear type torque transmission device according to claim 4, wherein said tips of said internal teeth are respectively arranged symmetrically with respect to said radial direction from said junction points of said coupling portions and said inner periphery.

11. A planet gear type torque transmission device according to claim 2, wherein tooth bottoms are located between adjacent pairs of said internal teeth and wherein at least two tooth bottoms are located between adjacent pairs of said coupling portions.

12. A planet gear type torque transmission device according to claim 3, wherein tooth bottoms are located between adjacent pairs of said internal teeth and wherein at least two tooth bottoms are located between adjacent pairs of said coupling portions.

13. A planet gear type torque transmission device according to claim 4, further comprising at least one additional internal tooth,
    wherein said internal teeth comprise a first internal tooth and a second internal tooth and said at least one additional internal tooth is disposed between said first internal tooth and said second internal tooth,
    wherein a first tooth bottom is located between said first internal tooth and said at least one additional internal tooth and a second tooth bottom is located between said second internal tooth and said at least one additional internal tooth, and wherein said first tooth bottom and said second tooth bottom are located between an adjacent pair of said coupling portions.

14. A planet gear type torque transmission device according to claim 5, wherein at least one of said tooth bottoms are located between each adjacent pair of said coupling portions.

15. A planet gear type torque transmission device according to claim 6, wherein tooth bottoms are located between adjacent pairs of said internal teeth and wherein at least two tooth bottoms are located between adjacent pairs of said coupling portions.

16. A planet gear type torque transmission device according to claim 7, wherein tooth bottoms are located between adjacent pairs of said internal teeth and wherein at least two tooth bottoms are located between adjacent pairs of said coupling portions.

17. A planet gear type torque transmission device according to claim 8, wherein tooth bottoms are located between adjacent pairs of said internal teeth and wherein at least two tooth bottoms are located between adjacent pairs of said coupling portions.

* * * * *